US010740928B2

(12) United States Patent
Kim

(10) Patent No.: US 10,740,928 B2
(45) Date of Patent: Aug. 11, 2020

(54) APPARATUS FOR PROVIDING VEHICLE IMAGE, SYSTEM HAVING THE SAME, AND METHOD FOR PROVIDING THE VEHICLE IMAGE

(71) Applicants: HYUNDAI MOTOR COMPANY, Seoul (KR); KIA MOTORS CORPORATION, Seoul (KR)

(72) Inventor: Seong Un Kim, Anyang-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/175,074

(22) Filed: Oct. 30, 2018

(65) Prior Publication Data

US 2020/0051283 A1    Feb. 13, 2020

(30) Foreign Application Priority Data

Aug. 8, 2018    (KR) .......................... 10-2018-0092192

(51) Int. Cl.
| | | |
|---|---|---|
| *G06T 7/90* | (2017.01) | |
| *G06T 7/73* | (2017.01) | |
| *B60R 1/00* | (2006.01) | |
| *G06T 11/00* | (2006.01) | |

(52) U.S. Cl.
CPC .................. *G06T 7/90* (2017.01); *B60R 1/00* (2013.01); *G06T 7/74* (2017.01); *G06T 11/001* (2013.01); *G06T 2207/30252* (2013.01)

(58) Field of Classification Search
CPC . G06T 7/90; G06T 11/001; G06T 7/74; G06T 15/00; G06T 2207/30252; G06T 2207/30261; G06K 9/00791; G06K 9/00805; G06K 9/46; G06K 9/00201; G09G 5/02; G09G 5/06; B60R 1/00; B60R 2300/308; B60R 2300/205
See application file for complete search history.

(56) References Cited

FOREIGN PATENT DOCUMENTS

| | | | | | |
|---|---|---|---|---|---|
| CN | 107609457 A | * | 1/2018 | ............... | G06F 3/14 |
| JP | 2007129290 A | * | 2/2007 | ............... | B60R 1/00 |
| KR | 20150111471 A | * | 10/2015 | ............... | H04N 7/18 |

* cited by examiner

*Primary Examiner* — Maurice L. McDowell, Jr.
*Assistant Examiner* — Donna J. Ricks
(74) *Attorney, Agent, or Firm* — Morgan, Lewis & Bockius LLP

(57) ABSTRACT

A vehicle image providing apparatus includes: a processor that determines an actual color of a vehicle based on image data and generates a vehicle image based on the determined actual color of the vehicle; and a storage that stores information generated by the processor. The processor determines the actual color of the vehicle or an actual color of a nearby vehicle and reflects the determined color of the vehicle or nearby vehicle on the vehicle image which is displayed on a display of the vehicle.

16 Claims, 9 Drawing Sheets

APPARATUS FOR PROVIDING VEHICLE IMAGE, SYSTEM HAVING THE SAME, AND METHOD FOR PROVIDING THE VEHICLE IMAGE

CROSS-REFERENCE TO RELATED APPLICATION

This application is based on and claims the benefit of priority to Korean Patent Application No. 10-2018-0092192, filed on Aug. 8, 2018, in the Korean Intellectual Property Office, the disclosure of which is incorporated herein in its entirety by reference.

TECHNICAL FIELD

The present disclosure relates to an apparatus for providing a vehicle image, a system having the same, and a method for providing the vehicle image, and more particularly, relates to a technology for displaying an image that reflects an actual color of an ego vehicle or a nearby vehicle through a screen.

BACKGROUND

In recent years, a smart vehicle has been actively developed and commercialized for the safety and convenience of drivers and pedestrians. The smart vehicle uses an information technology (IT) to provide optimal transportation efficiency through introducing an advanced system for the vehicle and interworking with an intelligent transport system.

In detail, the smart vehicle performs various functions, such as an automatic driving function, an adaptive cruise control (ACC), an obstacle detection, a collision detection, providing a precise map, providing surrounding environment, setting a route to a destination, and providing a location of main places to maximize the safety and convenience of drivers and pedestrians.

In particular, the smart vehicle provides an image (including a vehicle image) of the surrounding environment, such as a relationship between an ego vehicle and nearby vehicles, to allow the driver to quickly recognize the surrounding environment of the ego vehicle. However, a conventional vehicle image providing apparatus simply displays a previously stored image rather than an image that reflects a vehicle's color in real time when the conventional vehicle image providing apparatus displays the vehicle image.

That is, the vehicle image displayed on the screen in the vehicle is limited to representative colors or a specific single color rather than an actual exterior color of the vehicle, and thus it is difficult for the driver to recognize the surrounding environment.

In a case where the vehicle image is replaced with the vehicle image having the actual color of the vehicle, a method for identifying a part number is required to allow the vehicle image providing apparatus to display the color of the vehicle after separately classifying the color of the vehicle. In this case, unnecessary management costs and complexity in assembly specification increase, and thus, it is difficult to actually apply the identification method to the vehicle.

SUMMARY

The present disclosure has been made to solve the above-mentioned problems occurring in the prior art while advantages achieved by the prior art are maintained intact.

An aspect of the present disclosure provides an apparatus for providing a vehicle image, a system having the same, and a method for providing the vehicle image, which are capable of improving user satisfaction and merchantability by providing a vehicle screen image after applying the vehicle image reflecting an actual color of an ego vehicle or nearby vehicles in real time without additional cost and regardless of production specifications.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle image providing apparatus includes: a processor that determines an actual color of a vehicle based on image data and generates a vehicle image based on the determined actual color of the vehicle; and a storage that stores information generated by the processor.

The processor determines the actual color of an ego vehicle or a nearby vehicle and reflects the determined color on the vehicle image provided to a display in the vehicle.

The processor selects a vehicle color determination area in a vehicle peripheral image data.

The processor selects a portion of an image of the ego vehicle among the vehicle peripheral image data as the vehicle color determination area when determining the color of the ego vehicle.

When determining the color of at least one vehicle of a front vehicle, a rear vehicle, a left vehicle, and a right vehicle corresponding to the nearby vehicle, the processor selects the vehicle color determination area of the front vehicle based on front image data among the vehicle peripheral image data, selects the vehicle color determination area of the rear vehicle based on rear image data among the vehicle peripheral image data, selects the vehicle color determination area of the left vehicle based on left image data among the vehicle peripheral image data, and selects the vehicle color determination area of the right vehicle based on right image data among the vehicle peripheral image data.

The processor extracts color coordinates of the vehicle color determination area and compares the extracted color coordinates with previously stored color coordinate information for each vehicle to determine the color.

When the determined color is compared with previously stored actual color codes of the vehicle and the actual color code matched with the determined color exists among the previously stored actual color codes, the processor reflects the color on the vehicle image based on the matched actual color code.

The processor reflects the color on the vehicle image based on the determined color.

When the determined color is compared with previously stored actual color codes of the vehicle and the actual color code matched with the determined color does not exist among the previously stored actual color codes, the processor receives a vehicle color from a user and reflects the received color on the vehicle image.

According to another aspect of the present disclosure, a vehicle image providing system includes a processor that determines an actual color of a vehicle based on image data and generates a vehicle image based on the determined actual color of the vehicle; and a display that displays the vehicle image generated by the vehicle image providing apparatus through a screen.

The vehicle image providing apparatus selects a vehicle color determination area in a vehicle peripheral image data.

The vehicle image providing apparatus extracts color coordinates of the vehicle color determination area and compares the extracted color coordinates with previously stored color coordinate information for each vehicle to determine the color.

The vehicle image providing apparatus reflects the determined color on the vehicle image without modification, or when the determined color is compared with previously stored actual color codes of the vehicle and the actual color code matched with the determined color exists among the previously stored actual color codes, the vehicle image providing apparatus reflects the color on the vehicle image based on the matched actual color code.

When the actual color code matched with the determined color does not exist among the previously stored actual color codes, the vehicle image providing apparatus receives a vehicle color from a user and reflects the received color on the vehicle image.

According to another aspect of the present disclosure, a vehicle image providing method includes: determining, by a processor, an actual color of a vehicle based on image data, generating, by the processor, a vehicle image using the determined actual color of the vehicle, and displaying the vehicle image on a display.

The determining of the actual color of the vehicle includes selecting a vehicle color determination area in vehicle peripheral image data, extracting color coordinates of the vehicle color determination area, comparing the extracted color coordinates with previously stored color coordinate information for each vehicle to determine the color, and comparing the determined color with previously stored actual color codes of the vehicle.

The generating a vehicle image using the determined actual color of the vehicle includes reflecting the color on the vehicle image based on a matched actual color code when the actual color code matched with the determined color exists among the previously stored actual color codes and receiving the vehicle color from a user and reflecting the received color on the vehicle image when the actual color code matched with the determined color does not exist among the previously stored actual color codes.

The determining of the actual color of the vehicle includes selecting a vehicle color determination area in the vehicle peripheral image data, extracting the color coordinates of the vehicle color determination area, and comparing the extracted color coordinates with the previously stored color coordinate information for each vehicle to determine the color.

The reflecting and providing of the determined actual color on the vehicle image includes reflecting the color on the vehicle image based on the determined color.

The determining of the actual color of the vehicle includes selecting a portion of an image of an ego vehicle among the vehicle peripheral image data as the vehicle color determination area when determining the color of the ego vehicle and selecting a portion of an image of a nearby vehicle among the vehicle peripheral image data as the vehicle color determination area when determining the color of the nearby vehicle.

According to the above, the vehicle image providing apparatus may improve the user satisfaction and merchantability by providing a vehicle screen service after applying the vehicle image reflecting the actual color of the ego vehicle or the nearby vehicles in real time without additional cost and regardless of production specifications.

In addition, various effects identified either directly or indirectly through the present disclosure may be provided.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
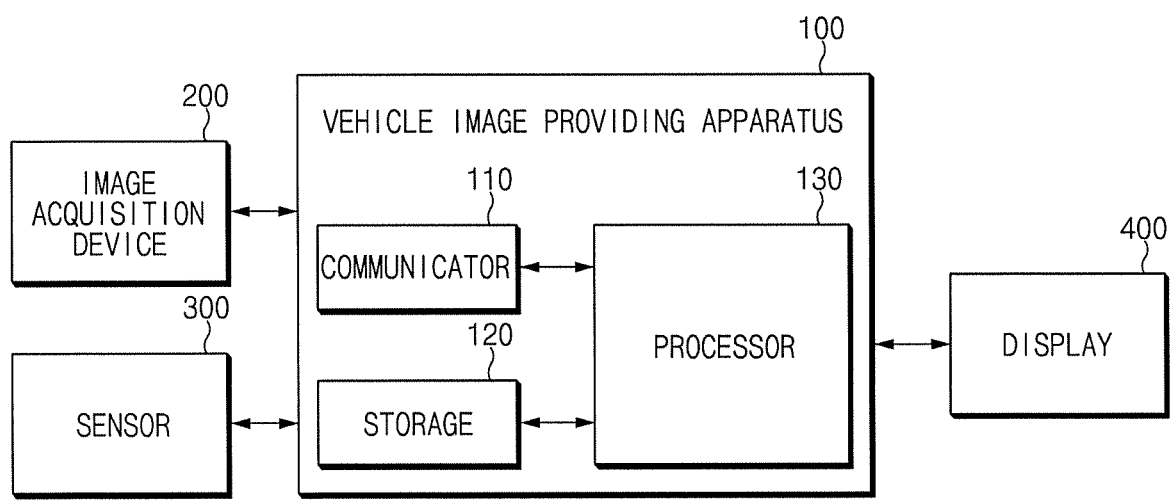
FIG. 1 is a block diagram showing a configuration of a vehicle image color reflection system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 9.

FIG. 1 is a block diagram showing a configuration of a vehicle image color reflection system according to an exemplary embodiment of the present disclosure.

Referring to FIG. 1, the vehicle image color reflection system according to an exemplary embodiment of the present disclosure may include a vehicle image providing apparatus 100, an image acquisition device 200, a sensor 300, and a display 400. The vehicle image providing apparatus 100, the image acquisition device 200, and the display 400 may be mounted in a vehicle.

The image acquisition device 200 may be an imaging sensor and may include cameras installed at front, right, left, and rear sides of the vehicle. The image acquisition device 200 may provide image data acquired by photographing the front, right, left, and rear sides of the vehicle to the vehicle image providing apparatus 100. In this case, each photographed image data may include a portion of an image of an ego vehicle. The image acquisition device 200 may include cameras for a conventional vehicle driving assistant or an autonomous driving system that requires the image acquisition, such as a smart cruise control (SCC), an around view monitor (AVM), a lane keeping assist system (LKAS) or the like, and nearby vehicle image data may be raw image source, may be primarily filtered by the image acquisition device 200, and may be provided to the vehicle image providing apparatus 100 as image data with minimum capacity.

The sensor 300 may include an illumination sensor and may provide an illumination sensor value to the vehicle image providing apparatus 100.

The display 400 may display an image for providing the vehicle service using an image of the ego vehicle or the nearby vehicle, which reflects an actual color of the ego vehicle or the nearby vehicle. The display 400 may be implemented by a head-up display (HUD), a cluster, or an audio video navigation (AVN). In addition, the display 400 may directly receive a color input from a user through a user setting menu (USM) of the cluster. In addition, the display 400 may include at least one of a liquid crystal display (LCD), a thin film transistor-LCD (TFT-LCD), a light emitting diode (LED), an organic LED (OLED), an active matrix OLED (AMOLED), a bended display, or a three-dimensional (3D) display. Some displays among them may be implemented by a transparent display including a transparent or optically transparent panel such that objects behind it are shown. In addition, the display 400 may be provided as a touch screen including a touch panel, and thus the display 400 may be used as an input apparatus in addition to an output apparatus.

In the various embodiments of the present disclosure, the image acquisition device 200, the sensor 300, and the display 400 are hardware devices.

The vehicle image providing apparatus 100 may determine the actual color of the vehicle based on vehicle peripheral image data, which are acquired from the image acquisition device 200, may reflect the actual color to the vehicle image, and may provide the vehicle image to the display 400.

The vehicle image providing apparatus 100 may include a communicator 110, a storage 120, and a processor 130.

In the present disclosure, the processor 130 maybe a hardware device (e.g. CPU) within a computer that executes a program, or can be contained on a single integrated circuit. The examples of the hardware device includes the CPI which can be further categorized by a microprocessor including an application-specific instruction set processor (ASIP), a graphics processing unit (GPU), a physics processing unit (PPU), a digital signal processor (DSP), network processor, etc. In the various embodiments, the processor 130 may include a software such as a word processor or document processor, or may include a system such as an information processor, a data processing system, and an information system. The processor 130 may include an electronic control unit (ECU) for controlling electrical system in the vehicle.

The communicator 110 is a hardware device implemented by various electronic circuits to transmit or receive signals through a wireless or wired connection. In the present disclosure, the communicator 110 may perform a communication through a CAN communication in the vehicle and may communicate with the image acquisition device 200 and the display 400.

Examples of the communicator 110 include a network interface card (NIC), Wi-Fi devices, and an access point.

The storage 120 may include at least one of the image data acquired from the image acquisition device 200, data calculated by the processor 130, information about the vehicle image reflecting the actual color, color coordinate information (color coordinate table) based on the color of the vehicle, conventional color coordinate information, information about the type of the ego vehicle, color information for each type of the vehicle, or color code information for each type of the vehicle.

The storage 120 may include at least one type of storage medium among a memory of a flash type, a hard disk type, a micro type, and a card type (e.g., a Secure Digital (SD) card or an eXtream Digital (XD) card) and a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The processor 130 may provide a vehicle screen service using the image of the ego vehicle or the nearby vehicle, which reflects the actual color of the ego vehicle or the nearby vehicle. For example, when a distance between the ego vehicle and the nearby vehicle and a collision prediction screen are displayed through the display 400, the processor 130 may provide the images of the ego vehicle and the nearby vehicles, which reflect the actual color, and thus, the user may more easily recognize the ego vehicle and the nearby vehicles. In this case, objects used to determine the actual color of the vehicle may include not only the ego vehicle but also a front vehicle traveling in front of the ego vehicle, a right vehicle traveling in the right lane of the ego vehicle, a left vehicle traveling in the left lane of the ego vehicle, and a rear vehicle following the ego vehicle.

The processor 130 may be electrically connected to the communicator 110, the storage 120, the image acquisition device 200, and the display 400, may electrically control each component, and may serve as an electrical circuit executing software instructions, and thus various data processing and calculations described below may be performed.

Figure 2:
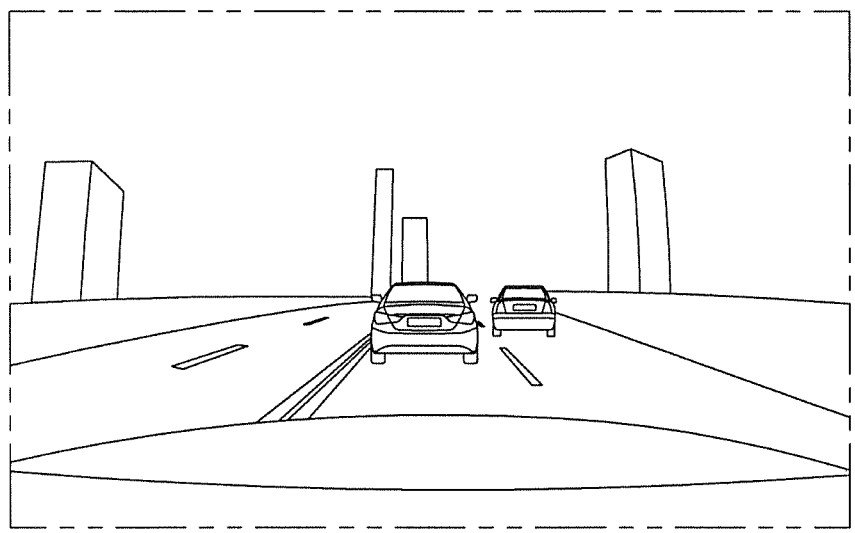
FIG. 2 is a view showing vehicle peripheral image data according to an exemplary embodiment of the present disclosure.
Figure 3:
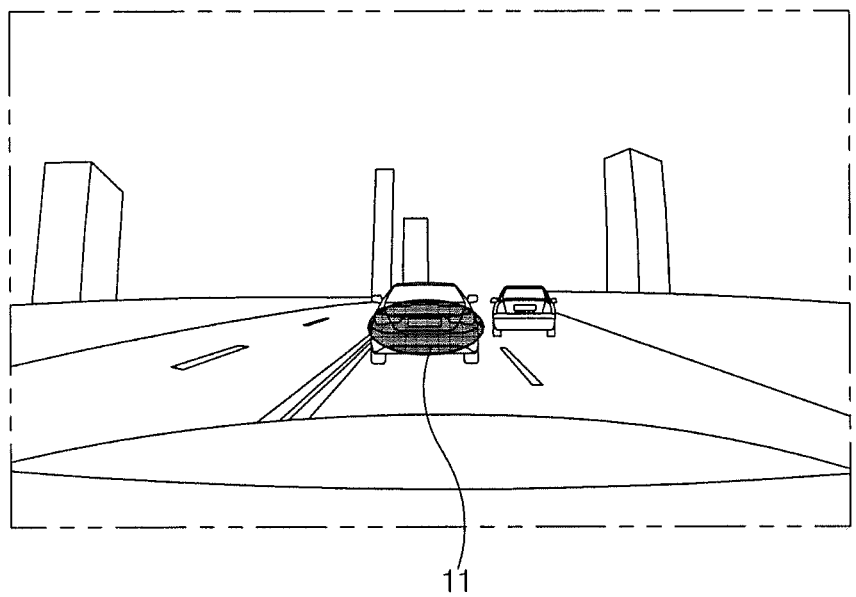
FIG. 3 is a view showing a vehicle color determination area for determining a color of a front vehicle among the vehicle peripheral image data according to an exemplary embodiment of the present disclosure.
Figure 4:
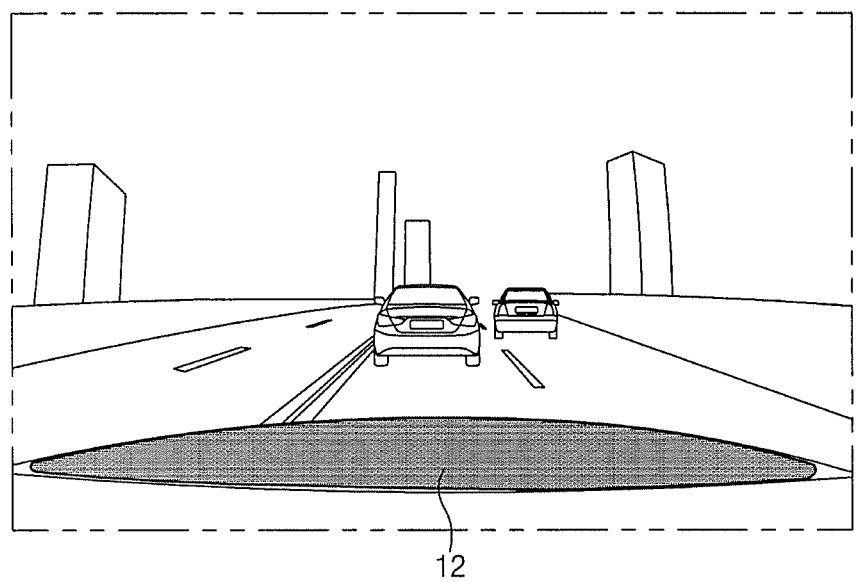
FIG. 4 is a view showing a vehicle color determination area for determining a color of an ego vehicle among the vehicle peripheral image data according to an exemplary embodiment of the present disclosure.

The processor 130 may select a vehicle color determination area from the vehicle peripheral image data provided from the image acquisition device 200. FIG. 2 is a view showing front image data as the vehicle peripheral image data according to an exemplary embodiment of the present disclosure. Referring to FIG. 2, a portion of the ego vehicle is displayed in the front image data with the front vehicle. FIG. 3 is a view showing a vehicle color determination area for determining a color of the front vehicle among the vehicle peripheral image data according to an exemplary embodiment of the present disclosure, and FIG. 4 is a view showing a vehicle color determination area for determining the color of the ego vehicle among the vehicle peripheral image data according to an exemplary embodiment of the present disclosure. Referring to FIG. 3, a portion of the image of the front vehicle among the front image data may be selected as a vehicle color determination area 11. Referring to FIG. 4, a portion of the image of the ego vehicle among the front image data may be selected as a vehicle color determination area 12.

The processor 130 may select the vehicle color determination area by taking into account incorrect determination caused by the front vehicle or an ambient light. That is, the processor 130 may reflect the illumination sensor value of the sensor 300 to acquire accurate color data from the image acquisition device 200. The processor 130 may determine the color of the vehicle based on the image data acquired during the day time rather than the night time on the basis of the illumination sensor value.

When determining the color of the ego vehicle, the processor 130 may select a portion of the image of the ego vehicle among the vehicle peripheral image data as the vehicle color determination area. The processor 130 may select the vehicle color determination area of the front vehicle based on the front image data among the vehicle peripheral image data. The processor 130 may select the vehicle color determination area of the rear vehicle based on rear image data among the vehicle peripheral image data and may select the vehicle color determination area of the left vehicle based on left image data among the vehicle peripheral image data. In addition, the processor 130 may select the vehicle color determination area of the right vehicle based on right image data among the vehicle peripheral image data.

Figure 5:
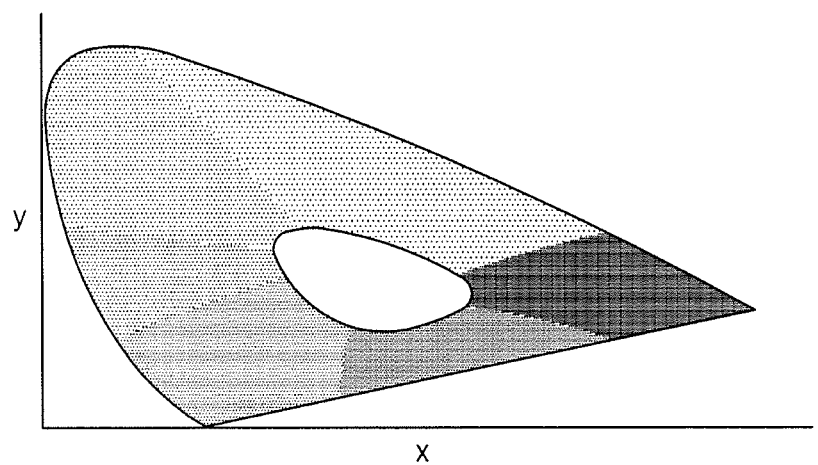
FIG. 5 is a color coordinate diagram for extracting color coordinates of a vehicle according to an exemplary embodiment of the present disclosure.

The processor 130 may extract color coordinates of the vehicle color determination area and compare the extracted color coordinates with the color coordinate information (color coordinate table) for each type of the vehicle, which are previously stored, to determine the color. FIG. 5 is a color coordinate diagram for extracting the color coordinates of the vehicle according to an exemplary embodiment of the present disclosure. In this case, the processor 130 may extract the color coordinates of a specific point in the vehicle color determination area or average color coordinates of the vehicle color determination area. The processor 130 may extract the color coordinates by taking an influence of the ambient light into account.

TABLE 1

| Color name | Code | Color coordinates |
|---|---|---|
| White | WC9 | 0.6081/0.3894 |
| Ion silver | N9V | . . . |
| Khaki metal | TK9 | . . . |

Table 1 shows an example of the color coordinate table.

The processor 130 may compare the determined color with previously stored actual color codes of the vehicle. In a case where a color code matched with the determined color exists among the previously stored actual color codes of the vehicle, the processor 130 may reflect the color on the vehicle image based on the matched color code. However, in a case where the color code matched with the determined color does not exist among the previously stored actual color codes of the vehicle, the processor 130 may directly receive the color of the vehicle from the user and may reflect the color input from the user on the vehicle image. In a case where the color of the vehicle is changed due to entire vehicle painting or repairs, the user may select the actual color of the vehicle since the color code matched with the determined color may not exist among the previously stored actual color codes of the vehicle. In addition, when the color code matched with the determined color does not exist among the previously stored actual color codes of the vehicle, the processor 130 may perform the determination process again since the processor 130 may malfunction.

Figure 6:
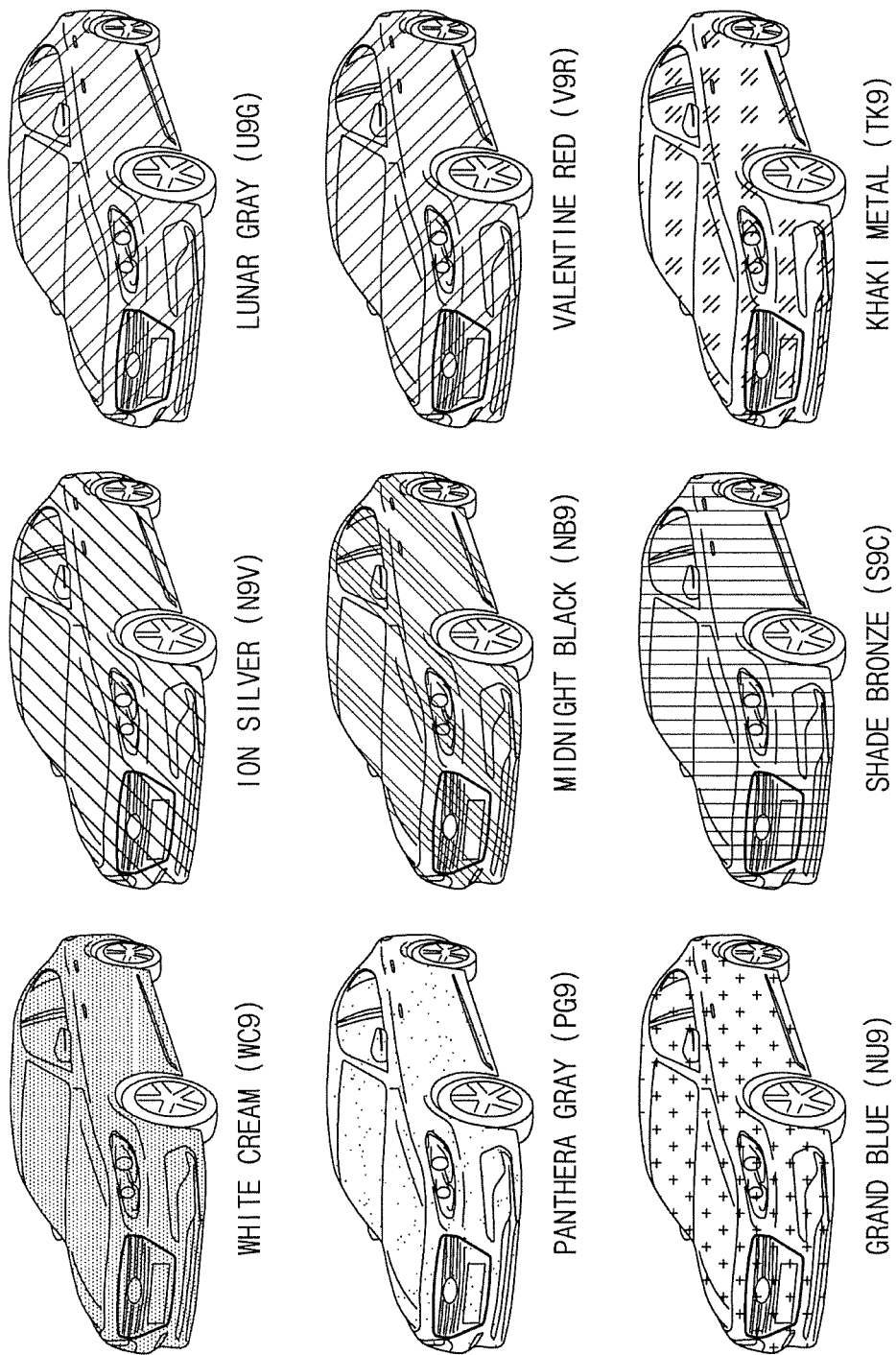
FIG. 6 is a view showing images of vehicles reflecting vehicle colors by color codes according to an exemplary embodiment of the present disclosure.

In the case of the ego vehicle, when the vehicle image is generated after determining the color of the ego vehicle for the first time, the processor 130 may store the vehicle image of the ego vehicle and may use the stored vehicle image of the ego vehicle without continuously determining the color of the ego vehicle when the vehicle screen service is provided. However, since the nearby vehicle is continuously replaced with another vehicle, the processor 130 may continuously perform an algorithm for reflecting the vehicle color on the nearby vehicle while driving. FIG. 6 is a view showing images of vehicles reflecting vehicle colors by color codes according to an exemplary embodiment of the present disclosure. In this case, the processor 130 may control the display 400 to display items, such as an actual vehicle color, a manual selection color, and a representative color, such that the user selects the items.

The processor 130 may determine the color from the color coordinates and may reflect the determined color on the vehicle image without comparing the determined color with the color codes after extracting the color coordinates.

As described above, the embodiment for determining the color of the ego vehicle or the front vehicle using the front image data of the vehicle has been described in the present disclosure, but the present disclosure should not be limited thereto or thereby, and the color of the ego vehicle, the vehicle traveling in a next lane, or the vehicle following the ego vehicle may be determined based on the image data of the side or rear of the vehicle.

Figure 7:
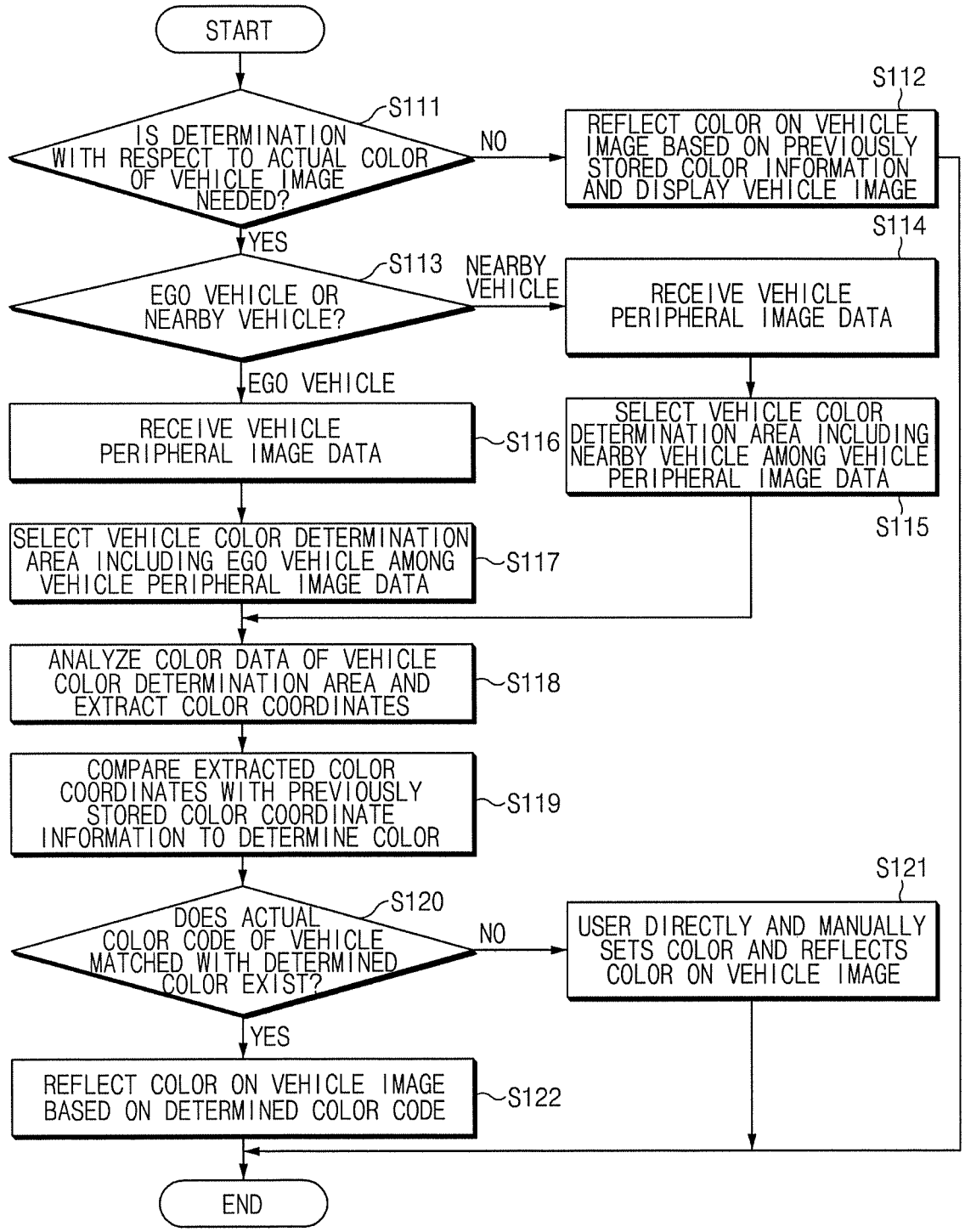
FIG. 7 is a flowchart illustrating a vehicle image color reflection method according to an exemplary embodiment of the present disclosure.

Hereinafter, a vehicle image color reflection method according to an exemplary embodiment of the present disclosure will be described with reference to FIG. 7. FIG. 7 is a flowchart illustrating the vehicle image color reflection method according to an exemplary embodiment of the present disclosure. Hereinafter, it is assumed that the vehicle image providing apparatus 100 shown in FIG. 1 performs the process of FIG. 7. In addition, in the descriptions of FIG. 7, operations described as being performed by apparatuses may be understood as being controlled by the processor 130 of the vehicle image providing apparatus 100.

Referring to FIG. 7, the vehicle image providing apparatus 100 determines whether the determination with respect to the actual color, which is to be reflected on the vehicle image, is needed (S111). For example, in a case where the distance between the ego vehicle and the nearby vehicle is displayed through the screen during an operation of an inter-vehicle distance maintenance system, the determination with respect to the actual color is needed to be performed since the actual color may be reflected and displayed when the ego-vehicle and the nearby vehicle are displayed. In the case of the ego vehicle, when the vehicle image information reflecting the actual color of the ego vehicle are previously stored, a process for determining the actual color of the ego vehicle does not need to be performed.

In a case where the determination with respect to the actual color that is to be reflected on the vehicle image is not needed to be performed in accordance with the determined result in operation S111 (i.e., the actual color is previously determined and stored), the color may be reflected on the vehicle image and displayed based on the previously stored vehicle color information (S112).

On the contrary, in a case where the determination with respect to the actual color, which is to be reflected on the vehicle image, is needed to be performed, the vehicle image providing apparatus 100 determines whether to determine the color of the ego vehicle or to determine the color of the nearby vehicle (S113).

When it is determined to perform the determination with respect to the color of the nearby vehicle in operation S113, the vehicle image providing apparatus 100 receives the vehicle peripheral image data including the image of the nearby vehicle from the image acquisition device 200 (S114). In this case, the nearby vehicle may be one of the front vehicle, the right vehicle, the left vehicle, and the rear vehicle, which is a nearby vehicle required depending on the provided service. For example, when the image of the rear vehicle is needed, the vehicle image providing apparatus 100 may receive image data photographed by a rear camera disposed at a rear side of the vehicle, and when the image of the right vehicle is needed, the vehicle image providing apparatus 100 may receive image data photographed by a right camera disposed at a right side of the vehicle.

Then, the vehicle image providing apparatus 100 selects the vehicle color determination area including the nearby vehicle among the received vehicle peripheral image data (S115). FIG. 2 is the view showing the image data acquired by photographing the front side to determine the color of the image of the front vehicle, and FIG. 3 is the view showing the example that the portion of the front vehicle of FIG. 2 is selected as the vehicle color determination area 11. In this case, the vehicle image providing apparatus 100 may calculate an object among the nearby vehicle image and may select a portion of the object located within a predetermined distance from the ego vehicle in the corresponding object as the vehicle color determination area. The calculating of the object from the vehicle image may be performed by applying various conventional methods. FIG. 3 shows the embodiment for determining the color of the front vehicle, and similarly, the colors of the vehicles traveling on the rear side or the left and right lanes may be determined. To this end, the rear image data and the left and right image data may be used.

When it is determined to perform the determination with respect to the color of the ego vehicle in operation S113, the vehicle image providing apparatus 100 receives the vehicle peripheral image data from the image acquisition device 200 (S116) and selects the vehicle color determination area including the image of the ego vehicle among the received vehicle peripheral image data (S117). FIG. 4 shows the example that an area corresponding to a bonnet of the ego vehicle among the front image data of the vehicle is selected as the vehicle color determination area.

In the case of selecting the vehicle color determination area of the ego vehicle, the front image data, the left image data, and the right image data may be used, and the portion of the ego vehicle image included in the front image data, the left image data, and the right image data may be selected as the vehicle color determination area of the ego vehicle. In this case, the vehicle image providing apparatus 100 may previously have information about the bonnet of the ego vehicle among the image data photographed by the front camera, location information about a left door image of the ego vehicle among the left image data, and location information about a right door image of the ego vehicle among the right image data in advance.

Then, the vehicle image providing apparatus 100 analyzes the color data of the vehicle color determination area to extract the color coordinates (S118).

The vehicle image providing apparatus 100 compares the extracted color coordinates with the previously stored color coordinate information to determine the color (S119). In this case, when the color of the ego vehicle is determined, the determined color becomes the color of the ego vehicle, and when the color of the nearby vehicle is determined, the determined color becomes the color of the nearby vehicle. The previously stored color coordinate information may be color coordinate information stored based on the colors of the vehicles or color coordinate information including all common colors.

Then, the determined color is compared with the previously stored vehicle color code information, and it is determined whether the vehicle color code matched with the determined color exists (S120).

When it is determined that the matched vehicle color code does not exist in operation S120, the user may directly and manually set the color of the vehicle and may reflect the set color on the vehicle image when the vehicle image displayed (S121).

When it is determined that the matched vehicle color code exists in operation S120, the vehicle image providing apparatus 100 may reflect the color on the vehicle image based on the determined color code and may display the vehicle image (S122).

FIG. 7 shows the example for determining the color of the ego vehicle or the color of the nearby vehicle, however, when the determination with respect to the color of the ego vehicle and the determination with respect to the color of the nearby vehicle are needed to be performed, the color of the ego vehicle may be determined in advance through operations S116 to S122, and then the color of the nearby vehicle may be determined by repeatedly performing operations S114, S115, and S117 to S122. In addition, when the determination of the color with respect to all the front vehicle, the rear vehicle, and the left and right vehicles among the nearby vehicles is required, the color of the each vehicle may be sequentially determined using the front image data, the rear image data, and the left and right image data including each vehicle image.

Figure 8:
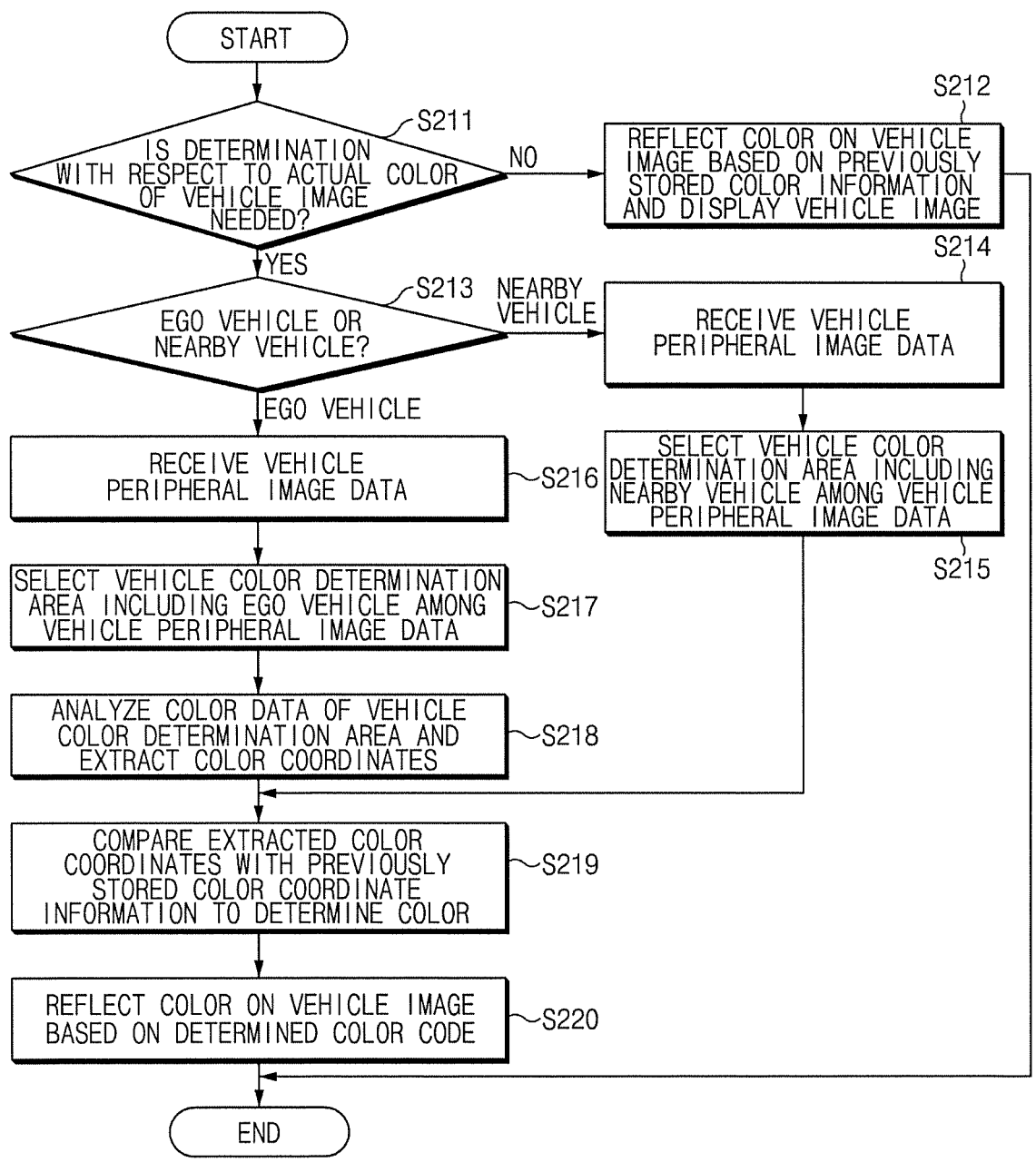
FIG. 8 is a flowchart illustrating a vehicle image color reflection method according to another exemplary embodiment of the present disclosure.

Hereinafter, a vehicle image color reflection method according to another exemplary embodiment of the present disclosure will be described with reference to FIG. 8. FIG. 8 is a flowchart illustrating the vehicle image color reflection method according to another exemplary embodiment of the present disclosure. Hereinafter, it is assumed that the vehicle image providing apparatus 100 shown in FIG. 1 performs the process of FIG. 8. In addition, in the descriptions of FIG. 8, operations described as being performed by apparatuses may be understood as being controlled by the processor 130 of the vehicle image providing apparatus 100.

Referring to FIG. 8, the vehicle image providing apparatus 100 determines whether the determination with respect to the actual color, which is to be reflected on the vehicle image, is needed to be performed (S211). For example, in a case where the distance between the ego vehicle and the nearby vehicle is displayed through the screen during an operation of an inter-vehicle distance maintenance system, the determination with respect to the actual color is needed to be performed since the actual color may be reflected and displayed when the ego-vehicle and the nearby vehicle are displayed. In the case of the ego vehicle, when the vehicle image information reflecting the actual color of the ego vehicle are previously stored, a process for determining the actual color of the ego vehicle does not need to be performed.

In a case where the determination with respect to the actual color that is to be reflected on the vehicle image is not needed to be performed in accordance with the determined result in operation S211 (i.e., the actual color is previously determined and stored), the color may be reflected on the vehicle image and displayed based on the previously stored vehicle color information (S212).

On the contrary, in a case where the determination with respect to the actual color, which is to be reflected on the vehicle image, is needed to be performed, the vehicle image providing apparatus 100 determines whether to determine the color of the ego vehicle or to determine the color of the nearby vehicle (S213).

When it is determined to perform the determination with respect to the color of the nearby vehicle in operation S213, the vehicle image providing apparatus 100 receives the vehicle peripheral image data including the image of the nearby vehicle from the image acquisition device 200 (S214). In this case, the nearby vehicle may be one of the front vehicle, the right vehicle, the left vehicle, and the rear vehicle, which is a nearby vehicle required depending on the provided service. For example, when the image of the rear vehicle is needed, the vehicle image providing apparatus 100 may receive image data photographed by a rear camera disposed at a rear side of the vehicle, and when the image of the right vehicle is needed, the vehicle image providing apparatus 100 may receive image data photographed by a right camera disposed at a right side of the vehicle.

Then, the vehicle image providing apparatus 100 selects the vehicle color determination area including the nearby vehicle among the received vehicle peripheral image data (S215).

Meanwhile, when it is determined to perform the determination with respect to the color of the ego vehicle in operation S213, the vehicle image providing apparatus 100 receives the vehicle peripheral image data from the image acquisition device 200 (S216) and selects the vehicle color determination area including the image of the ego vehicle among the received vehicle peripheral image data (S217). FIG. 4 shows the example that an area corresponding to a bonnet of the ego vehicle among the front image data of the vehicle is selected as the vehicle color determination area.

Then, the vehicle image providing apparatus 100 analyzes the color data of the vehicle color determination area to extract the color coordinates (S218).

The vehicle image providing apparatus 100 compares the extracted color coordinates with the previously stored color coordinate information to determine the color (S219), and the vehicle image providing apparatus 100 may reflect the color on the vehicle image based on the determined color of the vehicle and display the vehicle image reflecting the color (S220).

As described above, according to the present disclosure, the actual vehicle color may be determined and reflected on the vehicle image, and thus the vehicle image similar to the actual image may be provided to improve a user's immersion degree and merchantability.

In addition, when the vehicle is manufactured, the present disclosure may automatically determine and reflect the color of the vehicle without any complexity, such as separately classifying the part number of the vehicle image providing apparatus, during assembly.

Further, according to the present disclosure, the color of the vehicle may be automatically determined and reflected or the user may directly select the color of the vehicle depending on the user's needs, and thus the user's satisfaction may increase.

Figure 9:
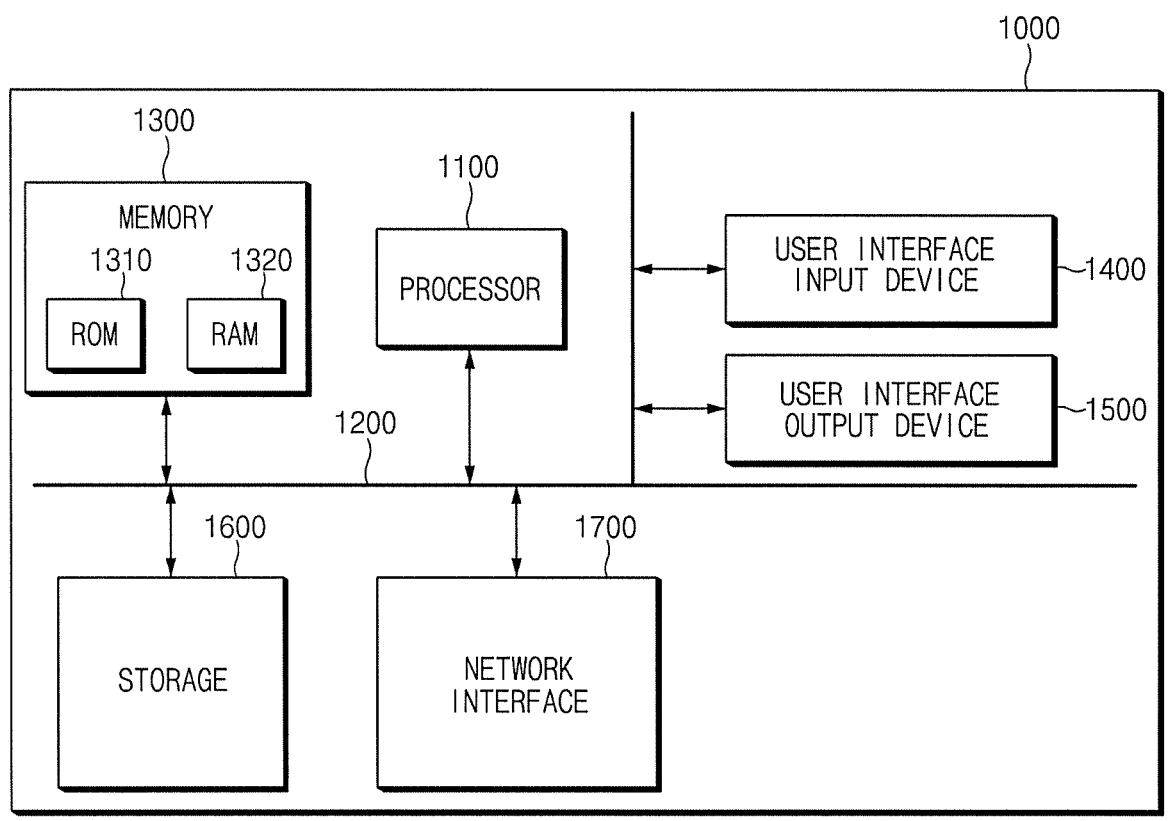
FIG. 9 is a block diagram showing a configuration of a computing system according to an exemplary embodiment of the present disclosure.

FIG. 9 is a block diagram showing a configuration of a computing system 1000 according to an exemplary embodiment of the present disclosure.

Referring to FIG. 9, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component in the user terminal.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. A vehicle image providing apparatus comprising:
   a processor configured to determine an actual color of a vehicle based on image data and to generate a vehicle image based on the determined actual color of the vehicle; and
   a storage configured to store information generated by the processor,
   wherein the processor is configured to:
   select a vehicle color determination area in a vehicle peripheral image data,
   extract color coordinates of the vehicle color determination area,
   compare the extracted color coordinates with previously stored color coordinate information, and
   determine the actual color of the vehicle or the nearby vehicle.

2. The vehicle image providing apparatus of claim 1, wherein the processor determines the actual color of the vehicle or an actual color of a nearby vehicle and reflects the determined color of the vehicle or nearby vehicle on the vehicle image which is displayed on a display of the vehicle.

3. The vehicle image providing apparatus of claim 1, wherein the processor is configured to select a portion of an image of the vehicle among the vehicle peripheral image data as a vehicle color determination area of the vehicle when determining the actual color of the vehicle.

4. The vehicle image providing apparatus of claim 1, wherein, when determining the actual color of nearby vehicle which includes at least one of a front vehicle, a rear vehicle, a left vehicle, or a right vehicle, the processor is configured to:
select a vehicle color determination area of the front vehicle based on front image data among the vehicle peripheral image data;
select a vehicle color determination area of the rear vehicle based on rear image data among the vehicle peripheral image data;
select a vehicle color determination area of the left vehicle based on left image data among the vehicle peripheral image data; and
select a vehicle color determination area of the right vehicle based on right image data among the vehicle peripheral image data.

5. The vehicle image providing apparatus of claim 1, wherein the processor compares the determined actual color of the vehicle or the nearby vehicle with previously stored actual color codes, and
when one of the previously stored actual color codes matches with the determined actual color, the processor reflects the determined actual color on the vehicle image based on the matched actual color code.

6. The vehicle image providing apparatus of claim 1, wherein the processor is configured to reflect the determined actual color on the vehicle image.

7. The vehicle image providing apparatus of claim 1, wherein the processor compares the determined actual color of the vehicle or the nearby vehicle with previously stored actual color codes, and
when none of the previously stored actual color codes matches with the determined actual color, the processor receives a vehicle color from a user and reflects the received color on the vehicle image.

8. A vehicle image providing system comprising:
a processor configured to determine an actual color of a vehicle based on image data and to generate a vehicle image based on the determined actual color of the vehicle; and
a display configured to display the vehicle image generated by the processor through a screen,
wherein the processor is configured to:
select a vehicle color determination area in a vehicle peripheral image data,
extract color coordinates of the vehicle color determination area,
compare the extracted color coordinates with previously stored color coordinate information, and
determine the actual color.

9. The vehicle image providing system of claim 8, wherein the processor is configured to:
reflect the determined color on the vehicle image.

10. The vehicle image providing system of claim 9, wherein, when none of the previously stored actual color codes matches with the determined actual color, the processor receives a vehicle color from a user and to reflect the received color on the vehicle image.

11. The vehicle image providing system of claim 8, wherein the processor is configured to:
when the determined color matches with one of previously stored actual color codes, reflect the determined actual color on the vehicle image based on the matched actual color code.

12. A vehicle image providing method comprising steps of:
determining, by a processor, an actual color of a vehicle based on image data;
generating, by the processor, a vehicle image using the determined actual color of the vehicle; and
displaying the vehicle image on a display,
wherein the step of determining the actual color of the vehicle comprises:
selecting a vehicle color determination area in vehicle peripheral image data,
extracting color coordinates of the vehicle color determination area, and
comparing the extracted color coordinates with previously stored color coordinate information to determine the actual color.

13. The method of claim 12, wherein the step of determining the actual color of the vehicle further comprises:
comparing the determined color with previously stored actual color codes of the vehicle.

14. The method of claim 13, wherein the step of generating the vehicle image comprises:
reflecting the determined actual color on the vehicle image based on a matched actual color code when one of the previously stored actual color codes matches with the determined color; and
receiving a vehicle color from a user and reflecting the received color on the vehicle image when none of the previously stored actual color codes matches with the determined actual color.

15. The method of claim 12, wherein the determining of the actual color of the vehicle comprises:
selecting a vehicle color determination area in the vehicle peripheral image data;
extracting the color coordinates of the vehicle color determination area; and
comparing the extracted color coordinates with the previously stored color coordinate information for each vehicle to determine the color.

16. The method of claim 12, wherein the step of determining the actual color of the vehicle comprises:
selecting a portion of an image of the vehicle among the vehicle peripheral image data as the vehicle color determination area when determining the actual color of the vehicle; and
selecting a portion of an image of a nearby vehicle among the vehicle peripheral image data as the vehicle color determination area when determining an actual color of the nearby vehicle.

* * * * *